US008555923B1

(12) United States Patent
Minnick

(10) Patent No.: US 8,555,923 B1
(45) Date of Patent: *Oct. 15, 2013

(54) VALVE ASSEMBLY

(75) Inventor: Michael W. Minnick, North Ridgeville, OH (US)

(73) Assignee: Oatey Co., Cleveland, OH (US)

( * ) Notice: Subject to any disclaimer, the term of this patent is extended or adjusted under 35 U.S.C. 154(b) by 604 days.

This patent is subject to a terminal disclaimer.

(21) Appl. No.: 12/799,026

(22) Filed: Apr. 16, 2010

Related U.S. Application Data

(60) Continuation-in-part of application No. 12/079,473, filed on Mar. 27, 2008, now Pat. No. 7,699,079, which is a division of application No. 10/639,185, filed on Aug. 11, 2003, now Pat. No. 7,373,953.

(51) Int. Cl.
*F16K 11/087* (2006.01)

(52) U.S. Cl.
USPC ............... 137/625.47; 137/625.19; 137/637.3

(58) Field of Classification Search
USPC ............................ 137/625.47, 625.19, 637.3
See application file for complete search history.

(56) References Cited

U.S. PATENT DOCUMENTS 289,637 A * 12/1883 Fitzgerald ..................... 137/583
2,000,552 A * 5/1935 Zaikowsky ................... 137/171
2,475,702 A * 7/1949 Funke ........................... 210/422
3,308,850 A * 3/1967 Gill .......................... 137/625.32
3,343,560 A * 9/1967 Nankivell ...................... 137/207
4,572,239 A * 2/1986 Koch et al. ............... 137/625.47
4,936,545 A * 6/1990 Ferrero ......................... 251/288
5,210,886 A * 5/1993 Coe, III ............................ 4/665
5,232,200 A * 8/1993 Combeau ................. 251/315.01
5,388,767 A * 2/1995 Moses ........................... 239/411
5,735,307 A * 4/1998 Charron ........................ 137/270
5,944,055 A * 8/1999 Dicky ...................... 137/625.47
5,988,218 A * 11/1999 Hecking .................. 137/625.29
6,206,028 B1 * 3/2001 Holden et al. ................ 137/271
6,230,744 B1 * 5/2001 Ahrweiler ................ 137/625.47
6,431,520 B1 * 8/2002 Ferrer Beltran .............. 251/288
D471,960 S * 3/2003 Humber ....................... D23/233
6,675,834 B1 * 1/2004 Lai .......................... 137/625.47

* cited by examiner

*Primary Examiner* — John Fox

(74) *Attorney, Agent, or Firm* — Calfee, Halter & Griswold LLP

(57) ABSTRACT

A valve assembly for plumbing installations. The valve assembly has a unitary valve body with three interconnected ports and a fluid control mechanism. Connector portions are formed about each port of the unitary valve body to thereby enable connection of the valve assembly into a fluid supply line and for connecting an appliance and various devices and fluid lines to the valve assembly. The fluid control mechanism of the valve assembly is constructed to direct fluid through the valve body and to enable the fluid flow to be shut off.

16 Claims, 5 Drawing Sheets

VALVE ASSEMBLY

This application is a Continuation-in-Part of Applicant's application U.S. Ser. No. 12/079,473, filed Mar. 27, 2008 now U.S. Pat. No. 7,699,079 which is a Division of Ser. No. 10/639,185, filed Aug. 11, 2003, now U.S. Pat. No. 7,373,953 issued May 20, 2008 and titled Valve Assembly, which are incorporated by reference herein.

BACKGROUND OF THE INVENTION

This invention relates generally to a valve assembly for plumbing installations. Particularly, the invention relates to a valve assembly having a valve body with at least three interconnected ports and a fluid control mechanism that provides a variety of options to a plumber when connecting the valve assembly into a fluid supply line.

The valve assemblies of the invention may also have valve bodies with a plurality of at least three cooperating port structures wherein fluid flow is controlled through the respective cooperating three port portions by means of a fluid control mechanism. The three ports are in communication in the valve body and may comprise an inlet port, an outlet port and an auxiliary output port. The valve assemblies are constructed to allow continuous one-directional flow through two ports of the valve body independent of the auxiliary outlet port.

The valve assemblies of the invention are constructed and arranged, for example, to replace a typical plumbing installation consisting of a "T" fitting, a separate valve structure and a length of pipe. The valve assemblies of this invention allow a plumber to choose the path of continuous flow through the valve assembly and to select a particular port to be, for example, an inlet or outlet port.

The valve assemblies are constructed to be connected to auxiliary devices that require a continuous fluid supply, such as water hammer arrester devices or pressure gauges, for example. For applications that require connection to such devices, the auxiliary port of the valve body may be threaded (male or female, NPSM, NPT or compression threads), may be a copper sweat connection, a barb or a solvent weld joint when using CPVC pipe. The other two ports of the valve assembly may have similar connecting portions to connect the assembly to a fluid supply or feed line and to a fluid output line.

The valve assemblies of the invention provide the advantage of providing versatile three port valve structures that enable a plumber to choose the fluid flow path through the valve structure.

SUMMARY OF THE INVENTION

The valve assemblies of the invention relate comprise a unitary body with three interconnected inlet/outlet ports and a control mechanism to control fluid flow through the three ports. The three ports may be an inlet port, outlet port and auxiliary outlet port. The valve assembly body has connector portions formed about each port thereby defining exterior portions of the unitary valve body. For example, the inlet port may have an externally threaded connector portion, the outlet port may be an internally threaded connector portion and the auxiliary port may be an enlarged opening connector portion with a hex-shaped exterior for receiving a device such as a water hammer arrester device, faucet, a pressure gauge or other device requiring fluid flow.

In a first embodiment, the valve body has an internal cavity connecting three ports, i.e., for fluid inflow, outflow and auxiliary outflow. A ball-type valve with a T-shaped channel is positioned within the body cavity and controlled for selective alignment with the three valve body ports to thereby control fluid flow through the ports. In the first embodiment, fluid also flows through the valve body cavity around the ball-type valve and between the sealing washer/seats. The valves allow continuous flow through the valve body in one direction through two ports independent of the auxiliary port. The control or on/off mechanism of the ball valve controls the passing flow independent of the auxiliary port.

In another embodiment a unitary valve body is provided having a pair of three interconnected inlet/outlet ports and a single control mechanism to control fluid flow through the pair of interconnected three port portions. The inlet ports are further provided to permit fluid inlet connection at 90° with respect to the outlet port. The valve elements are positioned within the valve body whereby in the off position, the outlet port is blocked.

The valve assemblies of the invention are constructed and arranged to replace a typical plumbing installation consisting of a "T" fitting, a separate valve and a length of pipe. The valve assemblies are constructed to allow the plumber to choose the path of continuous flow.

The valve assemblies of the invention utilize at least one three port valve body structure having a fluid control mechanism that provides a variety of options to a plumber when connecting into a fluid supply line.

An advantage of the valve assemblies of the invention is to provide unitary valve structures having three ports in communication and whereby the flow through pattern may be selected by the user. For example, any of the ports may be selected as an inlet or outlet port and which particular port to utilize for on/off purposes.

These and other benefits of this invention will become apparent from the following description by reference to the drawings.

DESCRIPTION OF THE PREFERRED EMBODIMENTS

The valve assemblies of the invention relate generally to valve structures having a unitary body with at least three cooperating ports, each having a connector portion, and a fluid control mechanism for fluid flow through the three ports. The valve body has at least one internal cavity connecting the three ports, i.e., for inflow, outflow and auxiliary outflow and in which a valve element is positioned to direct and block fluid flow through the valve body. Thus, a valve assembly may have a unitary body with more than one interconnected three port structure, for example.

The three ports may be designated as the inlet port, outlet port and auxiliary outlet port. The valve assembly has connector portions formed about each port thereby defining exterior portions of the unitary valve body. The inlet port may have an externally threaded connector portion, the outlet port may have an internally threaded connector portion and the auxiliary port may have a hex-shaped connector portion, for example.

Although the valve assembly is shown and described herein to have the above referenced connector portions formed at the ports of the valve body, the respective connector portions may be varied in configurations and may be positioned at different ports of the valve body. The specific configurations of the connector portions and positioning of the connector portions on the valve body provide flexibility and permit a variety of uses for the valve assembly of the invention.

A ball-type valve element with an internal T-shaped channel is positioned within the body cavity and controlled for selective alignment with the three valve body ports to thereby control fluid flow through the ports. For example, a ball valve is shown having a generally spherical shell having openings and a face forming a fluid blocking area which cooperate with an annular sealing member at the sealed port. In one embodiment, fluid also flows through the valve body cavity around the ball-type valve. The valve assemblies allow continuous flow through the valve body in one direction through two ports independent of the auxiliary port, for example. The fluid control or on/off mechanism of the ball valve controls the passing flow independent of the auxiliary port. The valve assemblies of the invention are constructed to replace a typical plumbing installation consisting of a "T" fitting, a separate valve and a length of pipe. The valve assemblies are constructed to allow the plumber to choose the path of continuous flow. For example, a port may be selected to be an inlet or outlet port.

Figure 1:
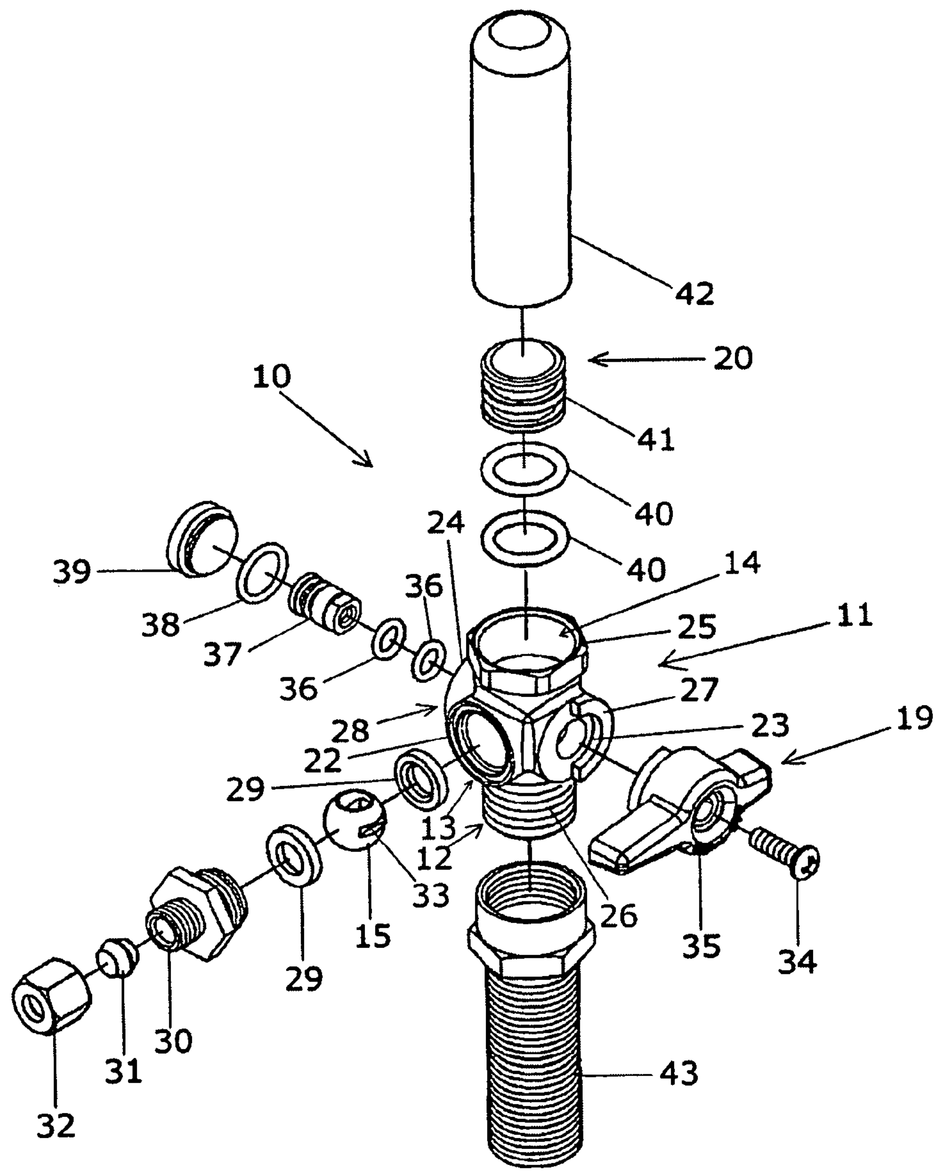
FIG. 1 is an exploded view in perspective showing an embodiment of a valve assembly of the invention having a water hammer arrester mounted in one port of the valve body.

Referring to FIGS. 1-6, the valve assembly 10 of the invention is shown having a valve body 11 with ports 12, 13 and 14. The three ports of the valve body 11 are for the ingress and egress of fluid through the valve assembly 10. For example, port 12 may be a fluid inlet port, port 13 a fluid outlet port and port 14 an auxiliary fluid outlet port. The valve body 11 is formed to have connection means at or around the three ports to permit easy connection to the valve body for fluid communication with plumbing lines and devices, such as a water hammer arrester device, a faucet, a pressure gauge and the like. As shown in FIG. 1, port 12 is a fluid inlet port having an externally threaded connecting portion 26 formed at the inlet port 12. Port 13 is shown having an internally threaded connecting portion 22 and auxiliary port 14 is shown to have an enlarged circular connecting opening with a hex-shaped exterior 25.

A valve element or ball 15 having channel openings 16, 17 and 18 is positioned in the valve body 11 in cavity or chamber 21 of the valve body 11 to control the fluid flow through the ports 12, 13 and 14. The channel openings 16, 17 and 18 of the valve ball 15 are formed by intersecting, interconnected T-shaped channels that align with the valve body ports 12, 13 and 14. The valve ball 15 is controlled by operating lever 19.

Figure 2:
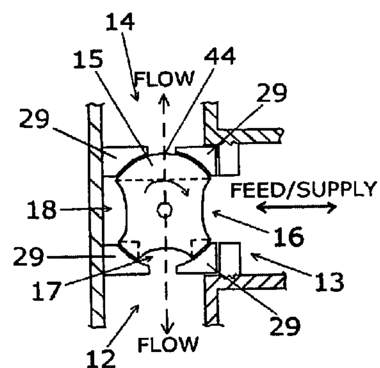
FIG. 2 is a plan view showing the fluid flow through the valve assembly of FIG. 1.
Figure 3:
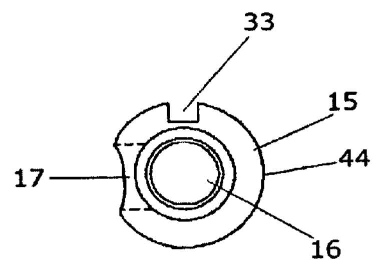
FIG. 3 is a lateral view of the valve ball of the valve assembly of FIG. 1.
Figure 4:
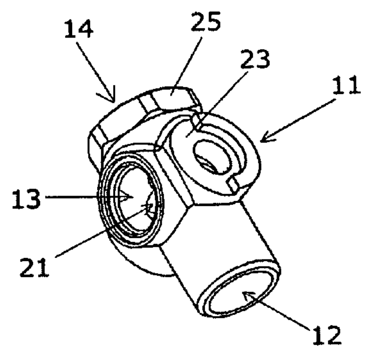
FIG. 4 is a perspective view of the valve body of the valve assembly of FIG. 1.
Figure 5:
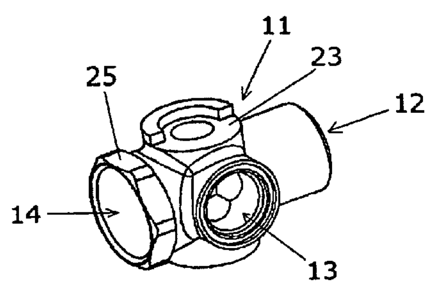
FIG. 5 is another perspective view thereof.
Figure 6:
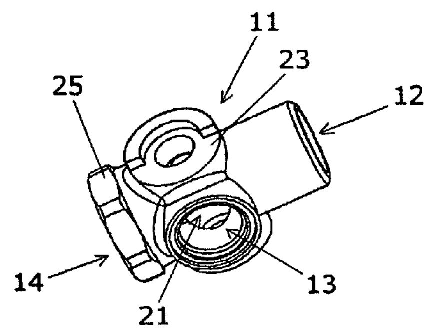
FIG. 6 is another perspective view thereof.

As shown particularly in FIG. 2, a diagrammatic flow pattern of the T-valve embodiment of valve body 11 is shown. The valve element or ball 15 is shown positioned in the valve body with respect to ports 12, 13 and 14 whereby fluid flow is provided between all three ports. Although ports 12, 13 or 14 could all be utilized as an inlet or as a feed/supply, channel opening 16 of valve element 15 is shown aligned with feed/supply port 13, channel opening 17 aligned with port 12 and fluid blocking portion 44 aligned with port 14. The cavity 21 within valve body 11 is larger in the direction between ports 12 and 14 so as to permit fluid flow around the outside of the valve ball 15. When the valve ball 15 is turned in the clockwise direction a quarter turn, the fluid blocking portion 44 is rotated with respect to washer 29 and is aligned with port 13 and fluid flow through the feed/supply port 13 is blocked. The valve body 11 is constructed to allow continuous flow through two ports, i.e., ports 12 and 13, independent of the third or auxiliary port 14.

Referring further to FIG. 2, the T-valve embodiment has three ports, namely, a feed/supply 13 and two outflow ports 12 and 14 connected to fluid flow lines. The T-valve structure provides flow between all three of the ports in the "on" position, as is shown. In the "off" position, the feed/supply line 13 is turned by means of a quarter turn of the valve ball 15 and the "T" valve structure provides a straight flow path between the two flow ports 12 and 14. The ball valve 15 is shown to be smaller in volume than the valve cavity, thereby allowing fluid flow around the ball valve in the valve cavity. However, because of the valve structure configuration, the feed line may be connected or installed at any of the three ports, depending on which way the plumber desires to direct fluid flow. This alternative gives the plumber options for the direction of the main fluid flow by directing fluid in either a straight or 90° direction from the main line supply.

FIG. 1 shows the valve assembly 10 or T-valve structure of the present invention in a separated state. The valve assembly 10 is shown having a water hammer arrester device 20 for attachment in the auxiliary port 14. In the "on" position, all three ports have flow communication. In the "off" position, continuous fluid flow is straight through the valve body 11 from the feed/supply line port 12 and the auxiliary port 14.

As shown particularly in FIG. 1, the water hammer arrester device 20 is connected to port 14. The water hammer device 20 has two O-rings 40, a piston 41 and a tube 42 which fits within the connecting opening 25 of the valve body 11.

The valve body 11 is shown to have a face 24 with an aperture 28 and through which two O-rings 36, a stem element 37 and an O-ring 38 are positioned within the valve body cavity 21 and secured by threaded plug 39. The valve ball 15 is shown to have a slot 33 which is engaged by the slotted end portion of stem member 37. The latter arrangement results in the valve element 15 being abutted by the surface of O-ring 38. Opposite face 24 of the valve body 11 is a face 23 having an aperture and a semicircular stop configuration 27 to secure and operate the handle member 35 and screw 34 of operating lever 19. The screw 34 threadingly engages the internally threaded end of stem member 37. The cooperation between the stop configuration 27 and the handle member 35 structure provides a one quarter turn between the on and off positions.

The valve body 11 is further shown to have an internally threaded connecting portion 22 about port 13 and through which washer 29, valve ball 15 and washer 29 may be placed within cavity 21 of the valve body 11 and held by compression adapter 30, compression sleeve 31 and compression nut 32. The latter configuration may be utilized to hold a flexible tube for extension from outlet port 13 to an icemaker, for example.

Referring to FIGS. 1 and 4-6, the valve body 11 having ports 12, 13 and 14 are shown and which may be utilized for various inlet and outlet purposes. An adapter structure 43 is shown in position for attachment to port 12 to operate as a fluid supply, for example. Port 13 is shown to be internally threaded to permit a water hose or supply line for extension to an appliance such as a washing machine, ice maker or the like. Port 14 is shown to be enlarged and having a hexagonal exterior configuration for receiving a gauge, water hammer arrester device, or the like. The hexagonal exterior surface may be engaged by a wrench, for example.

Referring to FIGS. 7-12, the valve assembly 50 of the invention is shown having a unitary valve body 51 with a pair of cooperating port structures, namely ports 52, 53, and 54 and ports 55, 56 and 57. The ports of the valve body 51 permit the ingress, egress and control of fluid flow through two portions of the valve assembly 50. For example, ports 52 and 55 may be fluid inlet ports, ports 53 and 56 being fluid outlet ports and ports 54 and 57 being auxiliary fluid outlet ports. Each port is further shown to have connector portions formed on or about each port of the valve body 51 to provide easy connection to the valve body 51 for fluid communication with plumbing lines and devices, such as water hammer arrester devices, faucets, pressure gauges or other devices requiring fluid flow. Body extensions 62 and 63 are shown having circular openings and top apertures which provide a 90° connecting portions (with respect to outlet ports 53 and 56) for connection to adapters 83. Outlet ports 53 and 56 are shown having externally threaded connecting portions 89 and 90, respectively, for connection to an internally threaded hose connector, for example. Auxiliary outlet ports 54 and 57 are shown having internally threaded connector portions 72 and 73 for receiving the externally threaded bottom portions of adapter structures 84, which are fixed to the remaining elements of the water hammer arrester devices 67.

A pair of valve elements or balls 58 each having channel openings 59, 60 and 61 are positioned in the valve body 51 to control the fluid flow through the ports 52, 53, 54 and ports 55, 56 and 57, respectively. The channel openings 59, 60 and 61 of the valve element 58 are formed by intersecting, interconnected T-shaped channels that align with the valve body ports 59, 60 and 61. The pair of valve balls 58 are controlled by a single operating lever 66.

Figure 8:
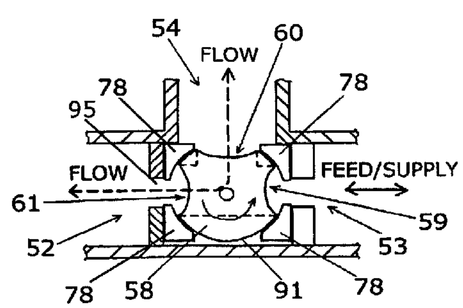
FIG. 8 is a plan view showing the fluid flow through the valve assembly of FIG. 7.
Figure 9:
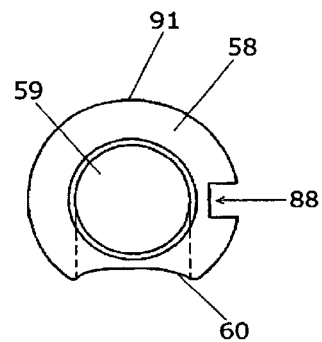
FIG. 9 is a lateral view of the valve element of FIG. 7.

As shown particularly in FIG. 8, a diagrammatic flow pattern of the 90° valve embodiment of valve body 51 is shown. The valve element or valve ball 58 is shown positioned with respect to valve body ports 52, 53 and 54 whereby fluid flow is provided between and by all three valve element ports 59, 60 and 61. Although any valve body port could be utilized as an inlet or feed/supply, channel opening 59 of the valve element 58 is shown aligned with feed/supply port 53, channel opening 60 with port 54, channel opening 61 with port 52 via opening 95 and fluid blocking portion 91 in the off position within the valve body 51. When the valve ball 58, shown held between annular washers 78, is turned a quarter turn in the counter clockwise direction, the feed/supply port 53 is blocked by means of fluid blocking portion 91 of valve element 58.

The "90°" valve embodiment of FIG. 8 has three ports and provides different flow paths than the T-valve embodiment of FIG. 2, however, this embodiment offers a similar advantage. In the "on" position, all three ports have flow through them. In the "off" position, the feed/supply port is turned off, however, the other two ports have flow through them. Thereby, the auxiliary port is in fluid communication with another port in both the "on" and "off" positions.

Figure 7:
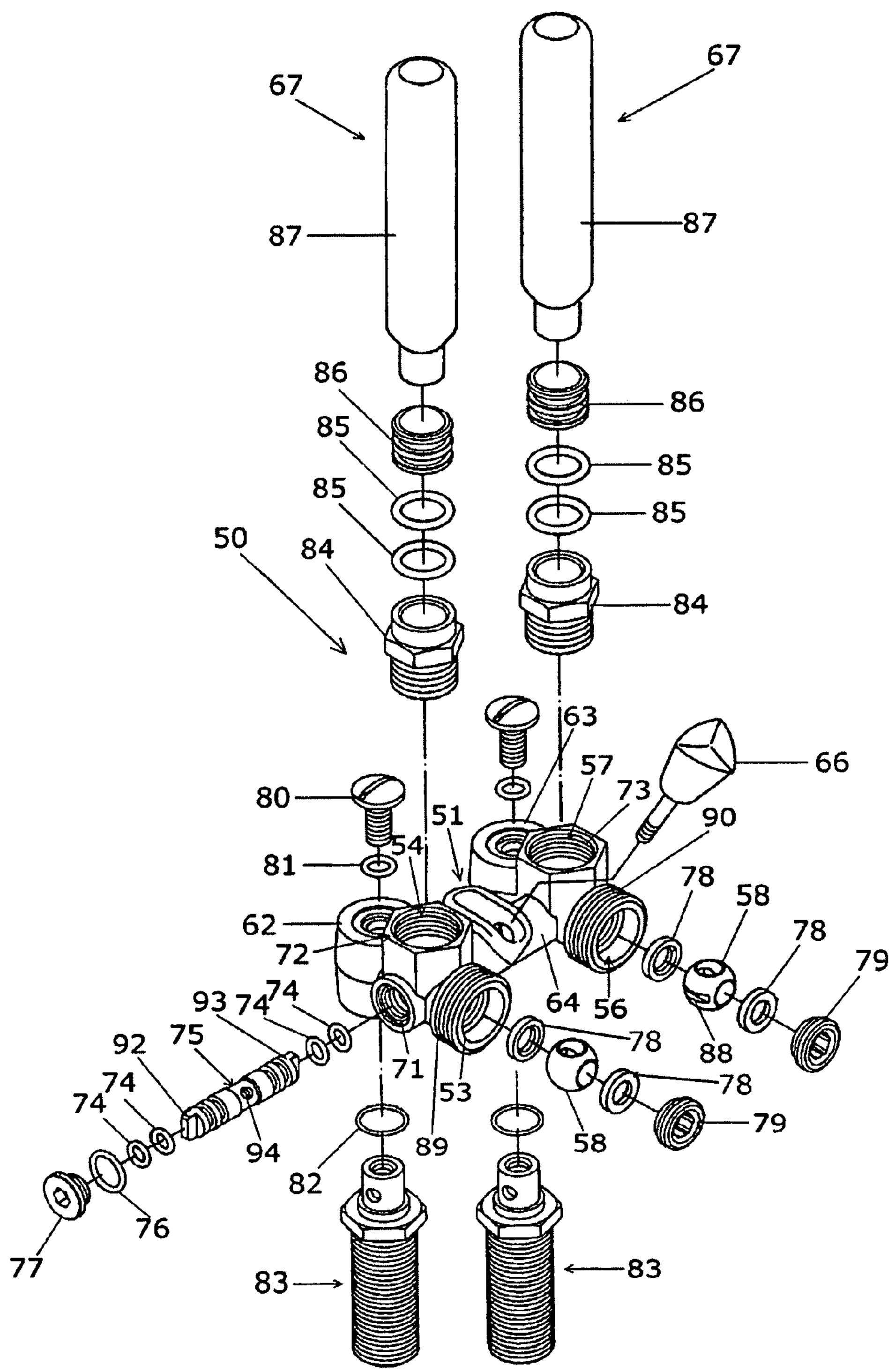
FIG. 7 is an exploded view in perspective showing another embodiment of a valve assembly of the invention.

As shown in FIG. 7, a water hammer arrester device 67 is connected to each port 54 and 57. The water hammer arrester device 67 has an adapter 84, two O-rings 85, a piston 86 and a tube 87. The adapter 84 threads into hammer arrester connectors 72 and 73 of ports 54 and 57, respectively. Other water hammer arrester devices may be utilized with the valve body 51 and these devices may be connected to the valve body in various manners.

Figure 10:
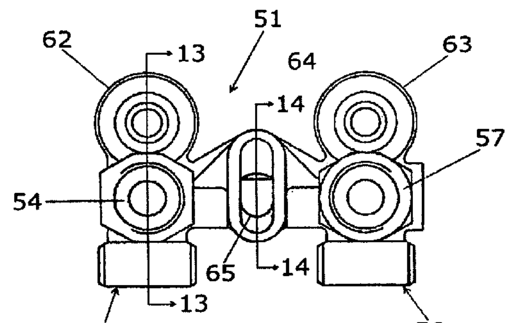
FIG. 10 is a top view of the valve body of the valve assembly of FIG. 7.
Figure 11:
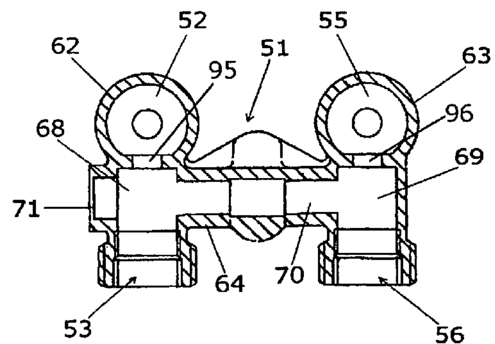
FIG. 11 is a sectional view of the valve body of FIG. 10.
Figure 12:
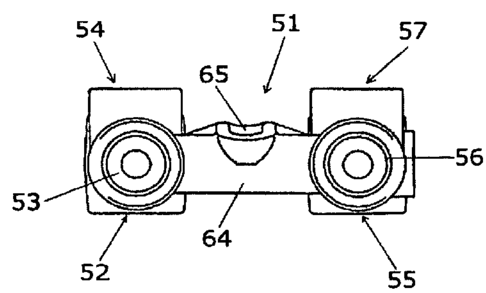
FIG. 12 is a lateral view of the valve body of FIG. 10.
Figure 13:
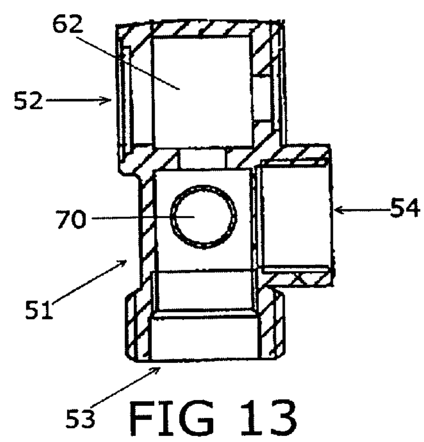
FIG. 13 is a sectional view of the valve body taken along line 13-13 of FIG. 10.
Figure 14:
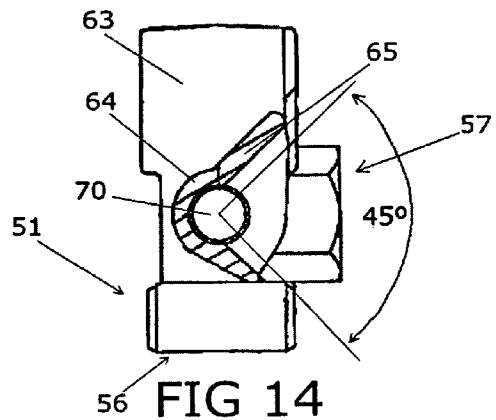
FIG. 14 is a sectional view of the valve body taken along line 14-14 of FIG. 10.

Referring to FIGS. 10-12, the valve body 51 is shown to have body extensions 62 and 63 and a unitary mid body portion 64. The interior of the valve body 51 has cavities or valve chambers 68 and 69 and channel 70. The extensions 62 and 63 direct fluid 90° with respect to the valve chambers 68 and 69 as fluid passes through apertures 95 and 96, respectively. The unitary mid body portion 64 has an opening 65 for operating lever 66.

Referring further to FIG. 7, a washer 78, valve ball 58, washer 78 and seat 79 are placed through ports 53 and 56 and held in place by a pair of O-rings 74, a stem member 75, a pair of O-rings 74, an O-ring 76 and a threaded stem lock element 77 which threads into threaded port 71 of the valve body 51. The washers 78 abut the interior wall of the valve chambers and the respective ball valves 58 rotate between the annular washers 78. Stem member 75 is shown to have a threaded centrally disposed aperture 94 and end extensions 92 and 93. The end extensions 92 and 93 of stem member 75 engage the slot 88 of each valve ball 58. Operating lever 66 having a threaded bottom portion is positioned through opening 65 of unitary mid body portion 64 to engage the threaded aperture 94 of stem member 75. Further, a screw 80 and O-ring 81 are placed through the top of body extensions 62 and 63, respectively, to secure adapters 83. Adapter 83 with O-ring 82 are shown positioned for connection to the body extensions 62 and 63, respectively, of the valve body 51.

The valve bodies 11 and 51 of FIGS. 1 and 7, respectively, may be formed of brass, cast or forged, or may be constructed of another suitable metal or metal alloy or of a plastic composition. Regarding the other elements of the valve assembly 10, the handle member 35 may be constructed of aluminum or a plastic, for example, the stem 37 constructed of brass, the O-rings 36 and 38 of NBR (rubber) and the plug member 39 of brass. The valve ball 15 may be formed of brass, the adjacent washers 29 of Teflon, the compression adapter 30, the compression sleeve 31 and the compression nut 32 of brass. The adapter 43 may be formed of brass or the like and the water hammer arrester tube 42 may be formed of brass, the internal piston 42 of brass and the O-rings 40 formed of NBR (rubber). The composition of these elements comprising the valve assembly 10 are exemplary and each element may be formed of like or other materials as known in the plumbing fixture art.

Regarding the valve assembly 50, the handle member 66 may be constructed of a metal having an ABS (plastic) lever handle, and which connects to the stem member 75, formed of brass. The O-rings 74 and 76 may be formed of NBR (rubber) and the stem lock member 77 formed of brass. The valve balls 58 may be formed of brass, the adjacent washers 78 formed of Teflon and the valve seats 79, which are replaceable, formed of brass. The adapters 83 may be composed of brass or the like and having an O-ring 82 formed of NBR (rubber). The water hammer tubes 87 may be formed of brass, the internal pistons 86 of brass, the O-rings 85 of NBR (rubber) and the adapters 14 of brass. As discussed, the water hammer devices 67 may have other structures and may be connected to the valve body 51 via other connecting structures. The composition of these elements comprising the valve assembly 50 are exemplary and each element may be formed of like or other suitable materials known in the plumbing fixture art.

The valve assemblies of this invention can be used to connect a device that requires a continuous fluid supply, such as a water hammer arrester device or pressure gauge, for example, as shown in FIGS. 1 and 7. For applications that supply such a device, any of the three input/output ports of the valve body may be threaded (male or female, NPSM, NPT or compression threads), comprise a copper sweat connection, a barb or a solvent weld joint when using CPVC pipe.

In summary, the valve assemblies of the invention may utilize at least one interconnected three port valve body structure having fluid control that provides a variety of options to a plumber when connecting into a fluid supply line.

As many changes are possible to the valve assembly embodiments of this invention, utilizing the teachings thereof, the description above and the accompanying drawings should be interpreted in the illustrative and not in the limited sense.

The invention claimed is:

1. A valve assembly comprising:

a) a unitary valve body having an internal cavity and at least three openings communicating with said internal cavity, said internal cavity having an interior wall and a predetermined volume;

b) a first and second spaced annular sealing washer positioned within said internal cavity, said first annular sealing washer being disposed against said interior wall at one of said at least three openings to form a sealed port;

c) a rigid stem member with a movable ball valve element mounted thereto, said movable ball valve element positioned between said first and second spaced annular sealing washers for rotation in said internal cavity of said valve body, said ball valve element having a flow blocking portion arranged in said internal cavity to block flow to or from said sealed port, said ball valve element having a volume smaller than said predetermined volume of said internal cavity to thereby allow fluid flow through said internal cavity and freely around said ball valve element;

d) a lever on the exterior of said unitary valve body, said lever connected to said rigid stem member to selectively rotate said flow blocking portion of said ball valve element with respect to said first annular sealing washer of said one sealed port, whereby said valve assembly controls fluid flow at said one sealed port and allows fluid flow around said ball valve element between the other ports; and wherein said at least three openings of said unitary valve body comprise an inlet port, an outlet port and an auxiliary port, wherein a water hammer arrestor or fluid pressure gauge is connected to said auxiliary port, and wherein said flow blocking portion is moved to block flow through said outlet port when in an off position.

2. The valve assembly of claim 1, wherein said one sealed port is either the inlet or the outlet port.

3. The valve assembly of claim 1, wherein said ball valve element has a plurality of openings to permit fluid flow therethrough.

4. The valve assembly of claim 1, wherein said movable ball valve element has a generally round configuration having an axis of rotation and wherein said valve body has stop means to permit said lever to be rotated one quarter turn.

5. The valve assembly of claim 1, wherein said valve body is formed of a metallic composition and wherein said sealed port is internally threaded, wherein one port is externally threaded and wherein one of said ports has a valve body portion about its opening in a formed hexagonal shape.

6. The valve assembly of claim 1, wherein said at least three ports of said valve body have a connecting portion selected from the group of connecting portions consisting of a male threaded portion, a female threaded portion, NPSM, NPT, compression threaded portions, a copper sweat connection, a barb and a solvent weld joint.

7. The valve assembly of claim 1, wherein said ball valve element is a spherical shell structure having a plurality of openings spaced from said fluid blocking portion and to permit fluid flow therethrough.

8. A valve assembly comprising:

a) a valve body structure having an internal cavity and at least three ports communicating with said internal cavity, said at least three ports defined by openings in said valve body structure, said internal cavity having a predetermined volume and an interior wall;

b) a first annular sealing element and a second annular sealing element spaced therefrom;

c) a rigid stem member and a movable valve element mounted on said rigid stem member for rotation in said internal cavity of said valve body structure, said valve element having a flow blocking portion, one said valve body port having said first annular sealing element positioned against said interior wall in said internal cavity and forming a sealed port, said valve element being disposed in said internal cavity between said sealed port and said second annular sealing element spaced therefrom, whereby said flow blocking portion of said movable valve element is arranged in said internal cavity to block flow to or from said sealed port, said valve element having a volume smaller than said predetermined volume of said internal cavity of said valve body structure to thereby allow fluid flow through said internal cavity and freely around said valve element; and d) a lever on the exterior of said valve body structure, said lever connected to said rigid stem member to selectively rotate and move said flow blocking portion of said valve element with respect to said first sealing element of said sealed port, whereby said valve assembly controls fluid flow at said sealed port and allows free fluid flow around said valve element to the other ports; and wherein said at least three ports comprise an inlet port, an outlet port and an auxiliary port, wherein a water hammer arrestor or fluid pressure gauge is connected to said auxiliary port, and wherein said flow blocking portion is moved to block flow through said outlet port when in an off position.

9. The valve assembly of claim 8, wherein said one sealed port is either the inlet or the outlet port.

10. The valve assembly of claim 8, wherein said movable valve element has a generally round configuration having an axis of rotation spatially between said first and second annular sealing elements and wherein said valve body structure has stop means.

11. The valve assembly of claim 8, wherein said valve body structure is formed of a metallic composition and wherein said sealed port is internally threaded, wherein one port is externally threaded and wherein one said ports has a valve body portion about its opening in a formed hexagonal shape.

12. The valve assembly of claim 8, wherein said at least three ports of said valve body structure have a connecting portion selected from the group of connecting portions consisting of a male threaded portion, a female threaded portion, NPSM, NPT, compression threaded portions, a copper sweat connection, a barb and a solvent weld joint.

13. A valve assembly comprising:

a) a valve body having a valve chamber with a plurality of openings forming ports, said valve chamber having a wall and a specified volume;

b) a first annular seal positioned in said valve chamber against said wall of said valve chamber to thereby form a sealed port and a second annular seal disposed in said valve chamber against said wall of said valve chamber spatially opposite said first annular seal;

c) a valve element having a fluid blocking portion and being disposed for rotation between said first and second annular seals in said valve chamber, said valve element having a volume smaller than said specified volume of said valve chamber;

d) a fluid control member connected to said valve element to selectively move said fluid blocking portion of said valve element with respect to said sealed port in said valve chamber; and wherein said ports comprise at least an inlet port, an outlet port and an auxiliary port, wherein a water hammer arrestor or fluid pressure gauge is connected to said auxiliary port, and wherein said fluid blocking portion is moved to block flow through said outlet port when in an off position.

14. The valve assembly of claim 13, wherein said valve element is a generally spherical structure having communicating openings therethrough, wherein one said valve opening is oppositely aligned with said fluid blocking portion and two of said openings are disposed at approximately 90 degrees from said fluid blocking portion and said oppositely aligned opening.

15. The valve assembly of claim 13, wherein one non-sealed port of said valve chamber has a device connected thereto which requires a continuous fluid supply.

16. The valve assembly of claim 13, wherein said one sealed port is either the inlet or the outlet port.

* * * * *